United States Patent [19]

Horowitz et al.

[11] 4,107,228

[45] Aug. 15, 1978

[54] UNIVERSAL PAINT COMPOSITION AND OBJECTS COATED THEREWITH

[75] Inventors: Carl Horowitz; Michael Dichter, both of Brooklyn; Mangara J. Duryodhan, Staten Island; Joseph A. Ioria, Ozone Park, all of N.Y.

[73] Assignee: Gulf & Western Manufacturing Company, New York, N.Y.

[21] Appl. No.: 755,165

[22] Filed: Dec. 29, 1976

Related U.S. Application Data

[63] Continuation of Ser. No. 544,282, Jan. 27, 1975, abandoned.

[51] Int. Cl.² .............................................. C08L 63/10
[52] U.S. Cl. .................................. 260/836; 260/835; 260/837 R
[58] Field of Search ................... 260/835, 836, 837 R, 260/837 PVC; 204/159.15, 159.24

[56] References Cited

U.S. PATENT DOCUMENTS

| | | | |
|---|---|---|---|
| 3,660,145 | 5/1972 | Johnson | 260/836 |
| 3,677,920 | 7/1972 | Kai | 204/159.15 |
| 3,698,931 | 10/1972 | Horowitz | 427/399 |

*Primary Examiner*—Paul R. Michl
*Attorney, Agent, or Firm*—Amster, Rothstein & Engelberg

[57] ABSTRACT

Novel paint compositions which may be universally applied to a variety of substrates such as metals or plastics without the use of an intermediate primer layer are formed from a mixture of a polymerizable vinyl monomer, an epoxy pre-polymer, a urethane resin, a peroxide polymerization initiator and a silver graft initiator in a suitable solvent. Conventional paint additives are also included in the composition. A one-coat application of the paint followed by conventional oven curing results in a painted object in which the paint is chemically bonded to the object and exhibits superior chemical and mechanical properties.

15 Claims, No Drawings

UNIVERSAL PAINT COMPOSITION AND OBJECTS COATED THEREWITH

This is a continuation of application Ser. No. 544,282 filed Jan. 27, 1975 now abandoned.

This invention pertains to novel paint compositions and the painted objects produced from the use of such compositions. More particularly, this invention relates to a universal paint composition which is capable of providing a superior surface coating chemically bonded to the object coated therewith, irrespective of the nature of the material from which the object is formed.

It is well-known in the art that many materials which are important in the production of manufactured articles and which require a finished or painted surface are difficult to paint effectively. Such materials as steel, aluminum and certain plastics exhibit little adhesion for many conventional paint formulations accordingly, normally require the utilization of paints which are specially tailored for the specific substrate to be painted or the utilization of a separate adhesion-promoting primer layer between the substrate and the paint layer in order to produce a painted surface meeting minimum service requirements with respect to chemical and mechanical properties. Wholly apart from such adherence difficulties, separate tailoring of paints for different substrates has generally been required in order to achieve the mechanical and chemical properties which are necessitated both by the differing physical characteristics of the substrate and the diverse environments to which the coated objects are exposed in use.

The prior art, see for example, Bragole, U.S. Pat. No. 3,764,730 and Burlant, U.S. Pat. No. 3,437,514, discloses compositions and processes for improving the adherence of paint to various substrates by employing unsaturated monomers or polymers in conjunction with electron beam or ultraviolet radiation to generate cross-linking reactions between certain polymers. Such techniques, of course, require the use of special equipment and do not automatically produce paints which are universally applicable to a variety of substrates. Horowitz, U.S. Pat. Nos. 3,401,049 and 3,698,931 describe chemical processes for intimately bonding vinyl monomers to a substrate utilizing silver or selected silver compounds to generate free radicals on the substrate surface. However, the utilization of such molecular grafting techniques does not, in and of itself, result in a universal paint composition.

It is an object of the present invention to provide novel paint compositions which may be employed to produce surface coatings which may be intimately bonded to any of a wide variety of substrates.

It is another object of the invention to provide universal paint compositions exhibiting mechanical and chemical properties such that they have utility on a broad spectrum of substrate materials and the materials coated therewith may be employed in diverse environments.

Yet, another object of the invention is to provide painted objects in which the paint or coating is chemically bonded to the surface of the object.

The objects of this invention are accomplished by providing a novel paint composition comprising a polymerizable vinyl monomer, an epoxy pre-polymer, a polyurethane binder resin, cross-linking or hardening agents and polymerization and molecular graft initiators. The novel compositions of the invention will generally also include appropriate solvents, pigments, pigment coupling agents, thixotropes, bodying agents, defoaming agents and similar materials which are widely used in the preparation of paints to assist in obtaining adequate suspension of pigment, proper viscosity and thixotropy so as to control the flow characteristics of the paint and eliminate sag, caking, stringiness, cobwebbing and other similar undesirable properties normally associated with paints.

Although epoxy resins, urethane resins and hardeners or cross-linking agents for such resins have heretofore been utilized in paint and coating compositions, the present invention is believed to produce novel and superior paint and coating compositions as a result of a complex series of polymerization and cross-linking reactions which serve to chemically bond and interlock these materials not only with each other but also with the substrate being coated and with the pigments employed to produce the desired color characteristics. The reactions are believed to proceed by the generation of free radicals on the substrate surface as a result of a reaction between the substrate and the molecular graft initiator, i.e., silver ions, in accordance with the following formula wherein MH = substrate:

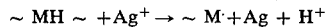
$$\sim MH \sim\ + Ag^+ \rightarrow\ \sim M\cdot + Ag + H^+$$

As an example, when a steel substrate is employed the micro-layer of oxides tenaciously bound to the steel surface are converted, in the presence of moisture from the atmosphere or from a solvent, to hydroxyl groups. These hydroxyl groups then react with the silver ion to form silver metal and feroxy radicals (FeO·). The feroxy radicals then react with the polymerizable monomer ($CH_2\!=\!CH\ X_1$) to produce a graft polymer radical as exemplified by the following equation:

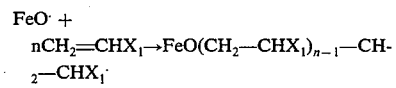
$$FeO\cdot\ +\ nCH_2\!=\!CHX_1 \rightarrow FeO(CH_2\!-\!CHX_1)_{n-1}\!-\!CH_2\!-\!CHX_1\cdot$$

Similar reactions may occur as a result of reactions between the substrate radical and activated the urethane resin or activated epoxy pre-polymer to produce grafted polymers. Moreover, the polymerization initiator reacts with the silver metal to regenerate silver ions capable of producing further free radicals on the substrate surface and peroxy radicals capable of generating homopolymer radicals in accordance with the following equations:

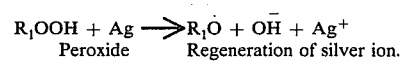
$$R_1OOH\ +\ Ag \longrightarrow R_1O\cdot\ +\ OH^-\ +\ Ag^+$$
Peroxide  Regeneration of silver ion.

$$R_1O\cdot\ +\ nCH_2\!=\!CHX_1 \longrightarrow R_1O(CH_2\!-\!CHX)_{n-1}\!-\!CH_2\!-\!CHX$$
Homopolymer radical.

As a result of chain transfer and coupling reactions, it is believed that a series of reactions occurs between the graft radicals, homopolymers and the urethane resin and epoxy pre-polymer.

The extent to which each of the foregoing reactions occurs cannot be accurately determined. However, the interaction generated as a result of the selection of monomers, pre-polymers and binder resins produce a strong chemical interaction between the substrate and the ingredients of the paint composition such that the paint compositions are chemically bonded to the surface of the object being painted and provide excellent resistance to a variety of corrosive atmospheres and mechanical stresses, without the need for intermediate primer layers, irrespective of the nature of the substrate.

Any polymerizable vinyl monomer may be employed in the paint composition of the invention, although polyfunctional monomers containing one or more functional groups in addition to the vinyl group are preferred since they provide additional reaction sites to further promote interaction between the various ingredients of the paint composition. Typical useful monomers are acrylic monomers containing hydroxy, carboxy, glycidyl or aziridinyl functional groups; e.g., glycidyl methacrylate, hydroxy ethyl or propyl acrylate, di-methyl amino ethyl methacrylate, 2-aziridinyl ethyl methacrylate, acrylic and methacrylic esters having a variety of alcoholic moieties, or combinations of the foregoing materials with each other or with monofunctional vinyl monomers. Additional useful polymerizable vinyl monomers are described in Horowitz, U.S. Pat. Nos. 3,401,049 and 3,698,931.

The epoxy pre-polymers which are useful in the paint composition of the invention are aliphatic, cyclo-aliphatic and aromatic epoxy resins having more than one epoxy group per molecule. Typical epoxy resins include aliphatic epoxy resins such as 1,4-butane diol diglycidyl ether; cyclo-aliphatic epoxy resins such as 3,4-epoxycyclohexylmethyl(3,4-epoxy)cyclohexane carboxylate and bis(3,4-epoxy-6-methyl-cyclo hexylmethyl)adipate; diglycidyl ethers of polyphenol epoxy resins such as bisphenol A and resorcinol diglycidyl ether epoxy resins; phenol-formaldehyde novolac polyglycidyl ether epoxy resins; and similar materials. Such epoxy resins are well-known in the art and are described in numerous patents including, for example, U.S. Pat. No. 3,776,978 and U.S. Pat. No. 3,424,699.

Conventional curing and cross-linking agents or hardeners for epoxy resins may be employed for the purpose of cross-linking and hardening the paint composition of the invention. Such hardeners include polyamines, polyamides, polysulfides, urea- and phenol-aldehyde resins, carboxylic acids or acid anhydrides and Lewis acid catalysts such as boron tri-fluoride. Alkyl, aryl andd alkoxy amines, and preferably polyamines including such materials as ethylenediamine, p-phenylenediamine, tetra-(hydroxyethyl) diethylenetriamine and similar well-known materials are preferred.

The polyurethane resins which are employed in the paint composition of the invention are well-known commercially available elastomers formed by the reaction of either a polyester or polyether with an aromatic or aliphatic diisocyanate and vulcanized through the isocyanate group by reaction with glycols, diamines, diacids or amino alcohols. The preferred polyurethane resins have 0 to 6% reactive —NCO— groups and are derived from aliphatic diisocyanates.

The graft polymerization initiator is silver ions and may be derived from silver salts such as silver nitrate, silver perchlorate or silver acetate, or from metallic silver powder which will be converted to silver ions by reaction with the peroxide polymerization initiator. Any of a wide variety of well-known peroxide-type initiators may be employed. Such initiators include benzyl peroxide, methyl ethyl ketone peroxide, tertiary butyl hydroperoxide, hydrogen peroxide, ammonium persulfate, di-tertiary butyl peroxide, tertiary butyl perbenzoate and peracetic acid.

The solvents employed to form the paint compositions of the invention are not critical and are selected giving due regard for solvent power, chemical stability, volatility, color, odor, toxicity, corrosion resistance and cost in accordance with practices which are well-known in the art. Ordinarily, combinations of solvents will be employed to form a solvent system which assures that all of the ingredients of the paint composition are dissolved. Thus, such solvents as methyl ethyl ketone, methyl isobutyl ketone, toluene, xylene, cyclohexanone, dimethyl formamide, tetrahydrofuran or combinations thereof may be employed to dissolve the urethane resin. Solvents such as cellusolve, cellusolve acetate, ethanol, isopropanol, butanol, butyl carbitol, ethyl acetate, benzene, toluene, xylene and combinations thereof may be employed to dissolve the other ingredients of the paint composition.

A wide variety of pigments may be employed in the paint composition of the invention or, alternatively, the composition may be employed without a pigment to provide a clear coating chemically bonded to the substrate. Inorganic pigments are preferred because of their stability at higher temperatures, although organic pigments may also be employed. Typical useful pigments include metal oxides and salts such as titanium dioxide, zinc oxide, lead oxide, ferrous and ferric oxide, chromium oxide, various lead salts and carbon block.

The paint composition of the invention is particularly well suited to the use of reactive coupling agents which serve for coupling and to lower the surface tension of the pigments and react with the resin and pre-polymer so as to enhance the interaction and, accordingly, the adhesion of the paint composition, including the pigment, to the substrate. The preferred coupling agents are organosilanes such as gamma glycidoxy propyl, trimethoxy silane, beta (3,4epoxycyclohexyl) ethyl trimethoxy silane, gamma-amino propyl triethoxy silane and vinyl triacetoxy silane.

The paint composition of the invention is compatible with a wide range of commercially available paint additives such as thixotropic agents, bodying agents, defoaming agents, anti-oxidants, ultraviolet light stabilizers and similar materials which are normally employed to eliminate sagging and caking, aid in suspension of the pigment, control levelling characteristics, increase paint consistency, suppress foaming as a result of shearing which can lead to the formation of pinholes and craters upon application of the paint, and the like. Typical materials include organic and inorganic thixotropes, fumed silica, cellulose derivatives, silicon based defoaming agents and a wide variety of other materials which are well-known in the art of paint formulation.

The proportions of materials utilized to form the novel paint composition of the invention are not critical and may be varied somewhat, depending on the particular application involved and the desired hardness, flexibility or other properties sought in the final paint composition. The table below sets forth the applicable ranges of proportions:

| Ingredient Type | Broad Range | Preferred Range |
| --- | --- | --- |
| Polymerizable Monomer | 0.5–5.0 wt.% | 0.5–2.5 wt.% |
| Polyurethane Resin | 2.0–10.0 | 2.0–5 |
| Epoxy Pre-Polymer | 5.0–30.0 | 10.0–15.0 |
| Hardener | 2.5–20.0 wt.% | stoich. with urethane and epoxy resins |
| Polymerization Initiator | 0.03–1.0 | 0.1–1.0 wt.% |

-continued

| Ingredient Type | Broad Range | Preferred Range |
| --- | --- | --- |
| Graft Initiator | 10–100ppm | 25–50ppm |
| Solvents | 30–85 wt.% | 40–65 wt.% |
| Pigment | 0–20.0 | 5.0–7.0 |
| Pigment Coupling Agent | 0–2.0 | 0.5–1.5 |
| Additives Thixotropes, Bodying Agents, De-foaming Agents, etc. | 0.5–5.0 | 1.0–3.0 |

The paint composition of the invention may be applied without the use of primers to a wide variety of substrate materials, including metal articles formed from steel or aluminum; plastic articles including films or solid objects formed from materials such as nylon, polyurethane, ABS terpolymers, polyolefins, urea-formaldehyde, polyphenylene oxides and blends of the foregoing plastics; ceramic articles; or any other material normally provided with a paint surface. The paint composition is applied to the substrate in any convenient fashion; such as by spraying, brush, or roller application, and is cured and chemically bonded to the object by exposing the painted object to temperatures in the range of 150° to 300° F. for periods ranging from 15 minutes to 2 hours depending on the nature of the material from which the substrate is formed.

The invention will be further understood by reference to the following examples.

EXAMPLE 1

A paint composition was prepared from the following ingredients, which are identified generically and, where appropriate, by the trademark or trade name which appears in parenthesis following the generic designation:

| | | |
| --- | --- | --- |
| Urethane pre-polymer (Rucothane 279) | 12.0 | grams |
| Polyamine hardener (Shell 111) | 20.0 | |
| Glycidyl methacrylate | 1.0 | |
| Hydroxy ethyl acrylate | 2.0 | |
| Hydroxy propyl acrylate | 2.0 | |
| Silver perchlorate (0.1% solution toluene) | 0.2 | |
| Benzoyl peroxide | 0.25 | |
| Xylene | 40.0 | |
| n-Butanol | 20.0 | |
| Methyl ethyl ketone | 87.0 | |
| Glycidoxy propyl trimethoxy silane | 2.0 | |
| Fumed silica (Cabosil) | 0.75 | |
| Thixotropic agent (M.P.A. 60) | 3.0 | |
| De-foaming agent (Monsanto 1244) | 0.7 | |
| Antioxidant (Irganox 1010) | 0.5 | |
| Ultraviolet stabilizer (Tinuvin P) | 0.5 | |
| Titanium dioxide | 19.0 | |
| Epoxide pre-polymer (Epon 828) | 30.0 | |

In order to prepare the composition, the urethane pre-polymer was first dissolved in 60 grams of methyl ethyl ketone by warming at 65° C. 20 grams of polyamine hardener was added to this solution followed by a mixture of all the solvents. This solution was sheared at moderate speed for a few minutes. The paint additives such as the de-foamer, the antioxidant and the ultraviolet stabilizers were gradually added to the solution. This was followed by the addition of the thixotropic agent and the T$_i$O$_2$ pigment. Finally, the fumed silica dispersing agent was added and the solution was maintained at high shear for 20 minutes. The solution was then cooled down to about room temperature and mixed with the epoxy pre-polymer, catalyst, graft initiator, monomer mixture, silane coupling agent and the rest of the solvent. This mixture was then slowly sheared for 5 minutes.

EXAMPLE 2

The paint composition of Example 1 was sprayed on test panels of non-phosphatized steel, aluminum, nylon and a thermoplastic material sold by General Electric under the trademark "Noryl", using a medium pressure spray gum at 40 psi. The painted metal samples were cured at 250° F. for 30 minutes and the painted plastic samples were cured at 180° F. for 60 minutes. Similar panels were prepared utilizing 2 commercially available paints sold under the commercial designations Chrysler DS-CC-258 and Cook XY69EW1. The methods of testing end test results are set forth below:

| | Methods of Testing |
| --- | --- |
| APPEARANCE - | (a) Smoothness - was observed visually. |
| | (b) Gloss - was observed visually at 60° and 80° angle and measured by a glossometer. |
| | (c) Covering - was observed visually if the surface is completely and uniformly covered. |
| | (d) Adhesion - Adhesion on all substrates have been tested by making 10 lines 0.1 inch apart in 1 direction and 10 lines across it, i.e., crosshatching. A piece of pressure-sensitive tape is pressed hard against the square and peeled off sharply. The number of squares not peeled off are counted for reporting percentage of adhesion. |
| CORROSION RESISTANCE - | (a) Water Immersion - The coated samples are immersed in water at 90° F. for up to 3 weeks. The samples are taken out every day and the adhesion is tested as above. |
| | (b) Salt Spray - The test panels are scored by 2 diagonal cuts and subjected to salt spray for 500 hours at 100° F. |

TEST RESULTS

| | | Commercial Paints | | | |
| --- | --- | --- | --- | --- | --- |
| Substrate | Example 1 Paint | DS-CC-258 (Chrysler) | | XY69EW1 (Cook) | |
| 1. (Appearance and gloss) | | | | | |
| | App. / Gloss | App. | Gloss | App. | Gloss |
| Steel | Smooth / Med.* | Smooth | High | Smooth | Glossy |
| Aluminum | Smooth / Med. | Smooth | High | Smooth | Glossy |
| Noryl foam | Smooth / Med. | Orange peel | Med. | Orange peel | Med. |
| Nylon | Smooth / Glossy | Smooth | Glossy | Smooth | Med. |

| | | Commercial Paints | |
| --- | --- | --- | --- |
| Substrate | Example 1 Paint | DS-CC-258 (Chrysler) | XY69EW1 (Cook) |
| 2. Adhesion | | | |

-continued
TEST RESULTS

| | | | |
|---|---|---|---|
| Steel | 100% | 65–75 | 80–85 |
| Aluminum | 100% | 70–75 | 90–95 |
| Noryl foam | 100% | 98–99 | 90–95 |
| Nylon | 100% | 75–80 | 85–90 |

3. Water Immersion - No. of days required for appreciable blistering.

| | | | |
|---|---|---|---|
| Steel | 18+ days | 1 day | 1 day |
| Aluminum | 18+ days | 1 day | 1 day |
| Noryl foam | 18+ days | 1 day | 1 day |
| Nylon | 18+ days | 1 day | 1 day |

4. Salt spray - No. of days required for appreciable rusting/blistering.

| | | | |
|---|---|---|---|
| Steel | 24+ days | 1 day | 1 day |
| Aluminum | 24+ days | 1 day | 1 day |
| Noryl | 24+ days | 1 day | 1 day |
| Nylon | 24+ days | 1 day | 1 day |

*at 85° angle - the gloss is 65%+.

The superiority of the paints of the invention are evident from the test results.

EXAMPLE 3

Test panels painted with the composition of Example 1 which had been prepared in accordance with the procedures set forth in Example 2 were subject to the following additional tests:

(a) Corrosion Resistance — A 2 square inch area of the panels were covered with a standard detergent solution and kept for 1 day at room temperature. The procedure was repeated on additional panels utilizing 5% acetic acid and 5% sodium hydroxide solutions. In each case, there was no loss of gloss or delamination.

(b) Outdoor Exposure — The panels were left on top of a roof in Brooklyn, N.Y. where they were exposed to normal weathering agents for more than 1 month. No dulling or blistering of the finish was observed.

(c) Ultraviolet Resistance — The panels were left under an ultraviolet lamp (Westinghouse Sun Lamp F.S20) at a distance of 1 foot for 3 weeks. There was no appreciable change in color or gloss and no cracking or flaking.

(d) Mechanical Properties — The panels were subjected to conventional tests for measuring pencil and Tukon hardness of the surface and exhibited a pencil hardness of 2H and a Tukon hardness of 16. Flexibility of the paint surface was determined by bending panels around a ⅛ inch mandrel. The painted surfaces showed no cracking or loss of adhesion as a result of the flexibility test. Impact resistance was measured by dropping a weight against both the painted panel surface and the unpainted opposite surface of the panel. The panels withstood 80+ inch lbs. of force in both directions without cracking or loss of adhesion.

Although the present invention has been described in detail by way of illustration and example for purposes of clarity and example, it is understood that changes and modifications may be made by those persons skilled in the art without departing from the spirit of the invention.

What is claimed is:

1. A heat-curable paint composition comprising as ingredients:
 (a) a polymerizable vinyl monomer, said vinyl monomer having at least one functional group in addition to the vinyl group;
 (b) a polyurethane resin, said polyurethane resin including reactive-NCO-groups and being derived from the reaction of a polyester or polyether with an aliphatic diisocyanate and vulcanized through the isocyanate group by reaction with a material selected from the group consisting of glycols, diamines, diacids or amino alcohols;
 (c) an epoxy resin prepolymer, said epoxy resin prepolymer having more than one epoxy group per molecule;
 (d) an epoxy resin hardening agent;
 (e) a peroxide polymerization initiator; and
 (f) a source of silver ions;
said ingredients being dissolved in a solvent system, said paint composition being heat-curable by exposure to temperatures in the range of 150° to 300° F. for periods ranging from 15 minutes to 2 hours.

2. A heat-curable paint composition comprising as ingredients:
 (a) 0.5 to 5.0 wt.% of a polymerizable vinyl monomer, said vinyl monomer having at least one functional group in addition to the vinyl group;
 (b) 2 to 10 wt.% of a polyurethane resin, said polyurethane resin including reactive-NCO-groups and being derived from the reaction of a polyester or polyether with an aliphatic diisocyanate and vulcanized through the isocyanate group by reaction with a material selected from the group consisting of glycols, diamines, diacids and amino alcohols;
 (c) 5.0 to 30 wt.% of a low molecular weight epoxy resin prepolymer, said epoxy resin prepolymer having more than one epoxy group per molecule;
 (d) 2.5 to 20 wt.% of a polyamine hardening agent;
 (e) 0.03 to 1.0 wt.% of a peroxide polymerization initiator;
 (f) 10 to 100 ppm of a source of silver ions;
 (g) 0 to 20 wt.% of a pigment; and
 (h) 0 to 2.0 wt.% of a coupling agent;
said ingredients being dissolved in a solvent system, said paint composition being heat-curable by exposure to temperatures in the range of 150° to 300° F. for periods ranging from 15 minutes to 2 hours.

3. The composition of claim 1, wherein said epoxy resin hardening agent is a polyamine.

4. The composition of claim 1, wherein said polyurethane resin includes 0 to 6% reactive —NCO— groups.

5. The composition of claim 1 further including a pigment and a coupling agent for said pigment.

6. The composition of claim 1, wherein said silver ions are derived from a silver salt or silver metal.

7. The composition of claim 1, including 0.5 to 5.0 wt.% of said monomer, 2.0 to 10 wt.% of said polyurethane resin, 5.0 to 30.0 wt.% of said epoxy pre-polymer, 2.5 to 20 wt.% of said hardener, 0.03 to 1.0 wt.% of said initiator and 10 to 100 part per million of said ions.

8. A coated object having a coating chemically bonded to its surface, said coating and chemical bonding being the product of a reaction at elevated temperature at the surface of said object with a heat-curable composition comprising as ingredients:
- (a) a polymerizable vinyl monomer, said vinyl monomer having at least one functional group in addition to the vinyl group;
- (b) a polyurethane resin, said polyurethane resin including reactive-NCO-groups and being derived from the reaction of a polyester or polyether with an aliphatic diisocyanate and vulcanized through the isocyanate group by reaction with a material selected from the group consisting of glycols, diamines, diacids and amino alcohols;
- (c) an epoxy resin prepolymer, said epoxy resin prepolymer having more than one epoxy group per molecule;
- (d) an epoxy resin hardening agent;
- (e) a peroxide polymerization initiator; and
- (f) a source of silver ions;

said ingredients being dissolved in a solvent system, said coating and chemical bonding resulting from the application of said composition to the surface of said object and the subsequent exposure thereof to temperatures in the range of 150° to 300° F. for periods ranging from 15 minutes to 2 hours.

9. The coated object of claim 8, wherein said epoxy resin hardening agent is a polyamine.

10. The coated object of claim 8, wherein said polyurethane resin includes 0 to 6% reactive —NCO— groups.

11. The coated object of claim 8 further including a pigment and a coupling agent for said pigment.

12. The coated object of claim 8, wherein said silver ions are derived from a silver salt or silver metal.

13. The coated object of claim 8, wherein said composition comprises 0.5 to 5 wt.% a polyfunctional, polymerizable vinyl monomer, 2 to 10 wt.% of a polyurethane resin, 5.0 to 30 wt.% of a low molecular weight epoxy resin prepolymer, said pre-polymer having more than one epoxy group per molecule, 2.5 to 20 wt.% of a polyamine hardening agent, 0.03 to 1.0 wt.% of a peroxide polymerization initiator, 10 to 100 ppm of a source of silver ions, 0 to 20 wt.% of a pigment, 0 to 2.0 wt.% of a coupling agent for said pigment dissolved in a solvent system for said ingredients.

14. The coated object of claim 13, wherein the surface of said object is a material selected from the group consisting of steel, aluminum and plastic.

15. A method of painting a substrate which comprises applying to a surface of said substrate a heat-curable paint composition comprising as ingredients:
- (a) a polymerizable vinyl monomer, said vinyl monomer having at least one functional group in addition to the vinyl group;
- (b) a polyurethane resin, said polyurethane resin including reactive-NCO-groups and being derived from the reaction of a polyester or polyether with an aliphatic diisocyanate and vulcanized through the isocyanate group by reaction with a material selected from the group consisting of glycols, diamines, diacids or amino alcohols;
- (c) an epoxy resin prepolymer, said epoxy resin prepolymer having more than one epoxy group per molecule;
- (d) an epoxy resin hardening agent;
- (e) a peroxide polymerization initiator; and
- (f) a source of silver ions;

said ingredients being dissolved in a solvent system, and chemically bonding said paint composition to said substrate by exposing the substrate having said composition applied thereto to a temperature in the range of 150° to 300° F. for a period of 15 minutes to 2 hours.

* * * * *